United States Patent Office 3,397,197
Patented Aug. 13, 1968

3,397,197
STREPTOMYCIN REDUCTION PROCESS
Edwin H. Makepeace, Jr., New London, Conn., assignor to Chas. Pfizer & Co., Inc., New York, N.Y., a corporation of Delaware
No Drawing. Filed Nov. 2, 1964, Ser. No. 408,411
6 Claims. (Cl. 260—210)

ABSTRACT OF THE DISCLOSURE

Reducing streptomycin or hydroxystreptomycin by adsorbing on a solid matrix, e.g., carbon or a cation exchange resin, and treating the adsorbate at an alkaline pH with an alkali metal borohydride or trimethoxyborohydride to produce the corresponding dihydrostreptomycin-type compound.

---

This invention relates to a novel process for the preparation of dihydrostreptomycins. More particularly, it relates to a process for the reduction of streptomycin-type compounds by means of certain borohydrides when said streptomycin-type compounds are adsorbed on a solid matrix.

Compounds of the genus comprising streptomycin and hydroxystreptomycin, referred to herein as streptomycin-type compounds, are readily reducible to the corresponding dihydro compounds. Prior methods for reducing the carbonyl function of streptomycin-type compounds comprise catalytic reduction using greater than atmospheric pressures and a catalyst such as nickel or platinum oxide, chemical reduction using, for example, stannous chloride, Al-Hg, ferrous sulfate, electrolytic reduction and reduction in solution with various borohydrides. All of these reduction methods including reduction by certain borohydrides involve reaction of the streptomycin-type compound, the substrate, in solution. Reduction of streptomycin in solution by means of borohydrides is described in U.S. Patent 2,790,792 issued Apr. 30, 1957 and in J. Am. Chem. Soc. 76, 5161 (1954).

Each of these heretofore known methods is subject to certain disadvantages such as cost of materials, the need for special equipment, the amount of time and labor required to recover the reduction product and to regenerate catalysts, the difficulty of isolating the pure dihydro compound and the overall economics of the methods. In the reduction of streptomycin-type compounds by means of borohydrides, and especially by sodium borohydride, to the corresponding dihydro compounds, the reduction has been reported (J. Am. Chem. Soc. 76, 5161, 1954) to be affected by the concentration, that is, by the amount of sodium borohydride used and by the purity or previous processing of the streptomycin. Using pure streptomycin as substrate, only a small excess of sodium borohydride was required to produce satisfactory reduction to dihydrostreptomycin. With partially purified streptomycin and ion exchange resin eluates even large excesses of sodium borohydride often produced unsatisfactory reduction.

It has now been found possible to reduce streptomycin and hydroxystreptomycin to the corresponding dihydro compounds in good yield with fewer steps and, hence, minimum processing time, and simplicity of recovery of high quality reduction product, irrespective of the past history of the streptomycin-type compound substrate. The process of this invention comprises reduction of the streptomycin-type compound when said compound is adsorbed on a solid matrix. As noted, the present process avoids the disadvantages of the prior art processes including that directed to the reduction of streptomycin-type compounds in solution by certain borohydrides. Further, the prior art processes, with the exception of the fermentation process for making dihydrostreptomycin, are time consuming, multiple step processes requiring as a first step the production of streptomycin by fermentation. The streptomycin must then be purified by a series of steps comprising adsorption on a cation exchange resin, elution from the resin, de-ashing, followed by concentration of the de-ashed material, high pressure hydrogenation, filtration and removal of the catalyst by a resin process. The resulting solution must then be concentrated and the product isolated.

The present process, on the other hand, comprises adsorption of the streptomycin-type compound from aqueous solutions, including whole fermentation broths, directly on a solid matrix such as, for example, a cation exchange resin or carbon. The resulting adsorbate is washed free of impurities, then subjected to reduction with a borohydride as described herein. The adsorbate of the dihydrostreptomycin-type compound is washed with water, de-ashed, the de-ashed material concentrated and the dihydro compound isolated, e.g., drum-dried or crystallized. This process eliminates many steps of the currently used methods, requires no special quality streptomycin-type compound or equipment and affords satisfactory yields of dihydro compound.

As solid matrices on which the streptomycin-type compound can be adsorbed and the resulting adsorbate, the substrate, subjected to the process of this invention there may be mentioned carbon, especially activated carbon, and cation exchange resins. A great variety of carbons can be used. It is advantageous, however, to use a coarse activated carbon. Such a carbon expedites filtration of the whole streptomycin-containing fermentation broth, if such is used, and adsorption of the streptomycin. Activated carbons of from about 10 to about 80 mesh size have been found highly useful for this process. Carbon having larger or smaller mesh size affords no advantages and frequently causes processing difficulties as a result of clogging when using very fine carbon. Particularly advantageous to the present process are activated carbons such as those described in U.S. Patent 2,655,497 issued Oct. 13, 1953.

Suitable cation exchange resins are those having as principle exchanging groups carboxyl or sulphonic acid groups. Satisfactory carboxyl-containing ion exchange resins are those prepared by the polymerization in beadlet form of methacrylic acid, or preferably, an ester of methacrylic acid and from about 1% to about 15% of a divinyl aromatic compound, such as divinylbenzene, divinyltoluene, divinylnaphthalene, and so forth, as a crosslinking material. If an ester is used to form the resin, the ester groups in the resin must of course be hydrolyzed to acid groups. Such resins are marketed commercially by Chemical Process Co. under the trade name Duolite CS–101 and by the Rohm & Haas Company under the trade names Amberlite IRC–200, Amberlite IRC–50 and Amberlite XE–89. They are described in detail in U.S. Patent 2,579,974. The resin is at least partially in salt form and is preferably adjusted to an equilibrium pH of from neutral to slightly basic (about 7 to 8) by means of an alkali (e.g., sodium hydroxide or potassium hydroxide) before contacting with the antibiotic solution. Typical carboxylated cation exchange materials useful in the application of this invention include the following:

(1) The partial esters produced by the reaction of polybasic carboxylic acids or acid anhydrides with polysaccharides or other polymeric substances containing esterifiable hydroxyl groups. Detailed procedures have been described by McIntire and Schenck (J. Am. Chem. Soc. 70, 1193 (1948).

(2) Synthetic cation-exchange resins containing carboxylic acid groups, for example:
 (a) Phenol-formaldehyde resins containing condensed aminocarboxylic acids or semi-amides of polycarboxylic acids, prepared by the methods described in the examples and descriptive portions of U.S. Patents 2,373,547 and 2,373,548.

(b) Resins prepared by condensation of an aldehyde with a carboxylated mono or polyhydric phenol, such as Wofatit C, which is produced in Germany by the reaction of formaldehyde with 3,5-dihydroxybenzoic acid as described in Fiat Final Report No. 715, Feb. 4, 1946.

(c) Resins prepared by treatment of a phenolaldehyde resin gel with carbon dioxide or substances that liberate carbon dioxide (bicarbonates) as described in Belgian Patent 447,662, Nov. 30, 1942.

(d) Insoluble copolymers produced from polymerizable mixtures containing acrylic or methacrylic acid, such as those prepared by the methods described in U.S. Patent 2,340,111.

Suitable strongly acid cation exchange resins, that is, those containing sulphonic acid groups, include such materials as the Dowex-50 resins (available from the Dow Chemical Company) which are sulfonated polystyrene compounds cross-linked with a divinyl aromatic compound such as divinylbenzene and described in U.S. Patents 2,191,853; 2,366,007; 2,518,420; and in BIOS 621, No. 22 (1446); the Amberlites such as Amberlite IR–120, and Amberlite XE–176 (available from the Rohm and Haas Company) which are sulfonated polystyrene compounds cross-linked with 8% and 1% divinylbenzene, respectively. In general, resins possessing a high degree of porosity are favored because of the relatively large molecular size of the streptomycin-type compounds. In the practice of this invention it is advantageous to employ cation exchange resins which have a low degree of cross-linkage, e.g., 1%–4%, with a copolymerizing agent such as divinylbenzene and are characterized by a relatively rapid rate of adsorption and/or elution of the given antibiotic. Representative of such resins are the commercially available Amberlite IRC–120 (Rohm and Haas), Dowex 50–$X_1$ and Dowex 50–$X_2$ (The Dow Chemical Co.). Moreover, since the mesh size of the resin particles affects the rate of adsorption and elution, the resin should preferably be from about 50 to 400 mesh U.S. sieve series if rapid release is desired.

The reducing agents useful in the present process are the borohydrides such as sodium borohydride, potassium borohydride, sodium trimethoxyborohydride, potassium trimethoxyborohydride, lithium borohydride, and lithium trimethoxyborohydride. At least one equivalent of the borohydride reducing agent should be used. In most instances an excess is desirable in order to insure maximum reduction. Excesses of 50–100% are especially effective in providing optimum yields of dihydro compounds. The preferred solvent is water although other solvents such as those which serve as solvents for the borohydrides can be used. The borohydride reducing agent is desirably but not necessarily used in solution. Suspensions of the borohydrides can also be used.

The reduction is conducted preferably at about room temperature. Higher or lower temperatures can be used but afford no advantages. The carbon or cation exchange resin adsorbates are contacted with an aqueous solution of the borohydride at a pH of from about 8 to about 11. The pH must be maintained at an alkaline level to avoid decomposition of the borohydride and elution of the streptomycin-type compound from the adsorbate. In the reduction of the streptomycin-type compound the substrate is actually the carbon or cation exchange resin adsorbate. The streptomycin-type compound is not eluted from the resin at all during the reduction by the borohydride. This is established by mixing a quantity of the streptomycin-type compound adsorbate in water at pH 8–11, filtering and assaying the resulting filtrate for streptomycin-type compound content. The maltol and streptidine assays (Waksman, "Streptomycin", Williams & Wilkins Co., 1949, pp. 84 and 87, respectively) both show zero streptomycin-type compound content. The addition of stabilized aqueous solution of sodium borohydride reducing agent containing an equimolar amount of sodium borohydride as a 40% solution to the streptomycin-type compound slurry followed by stirring for 15 minutes likewise gives negative results upon assay. The use of sodium borohydride solutions of from 10–40% concentration containing up to 50% excess of reducing agent likewise cause no elution of the streptomycin-type compound.

The reduction is adantageously conducted on a batch process by adding the borohydride solution to a slurry of the carbon or cation exchange resin absorbate in water. The process can also be conducted as a column process by percolating the borohydride solution through a column of the adsorbate. In such cases the column or tower containing the adsorbate is desirably agitated mechanically or with air or nitrogen to permit thorough contact of the reactants.

The absorbate containing the dihydro compound is washed with water until the boron is reduced to a satisfactory or minimum level.

The dihydrostreptomycin-type compounds are recovered by elution from the adsorbate with an aqueous acid, preferably a mineral acid such as hydrochloric or sulfuric acids, at a pH of about 3 or less. The preferred pH range of elution is from about 1 to about 2. Recovery of the dihydro compounds from the eluate is accomplished by known methods, e.g., concentration and crystallization or precipitation by addition of a water miscible organic solvent or of a substance which forms a water insoluble salt with the dihydro compound, or by drum-drying of the concentrate.

The following examples are given by way of illustration and are not to be construed as limiting the scope thereof in any way.

Example I

One l. of filtered streptomycin broth containing 4.36 mg./ml. (3.4 M.U.) of streptomycin is stirred with 15 g. of Nuchar C19ON (an activated charcoal available from West Virginia Pulp and Paper Co.). The pH is adjusted to 9.0 with sodium hydroxide, the suspension stirred for 10 minutes, then filtered. The filtrate contains 0.12 M.U. (million units) of streptomycin as determined by the maltol assay. The carbon adsorbate is slurried with 20 ml. of water, adjusted to pH 9.0 and 0.2 g. of sodium borohydride (approximately 2.8 equivalents) is added. The slurry is stirred for 1 hour then filtered. Maltol assay of the filtrate shows no streptomycin to be present. The carbon adsorbate filter cake is washed repeately with water to remove inorganic salts, and until boron free.

The dihydro compound is eluted at pH 1.5 (sulfuric acid). Maltol assay shows 0.02 M.U. streptomycin to be present. Streptidine assay shows 3.22 M.U. dihydrostreptomycin to be present for a 98% reduction.

Example II

The procedure of Example I is repeated but using hydroxystreptomycin in place of streptomycin. The product upon assay is found to consist almost entirely of dihydrohydroxystreptomycin.

Example III

Repetition of the procedure of Example I using the following activated carbons in place of Nuchar C19ON gave similar results. In each instance reduction proceeded to the extent of at least 98%.

Pelletized activated charcoal (from wood).—Barnebey Cheney
Pelletized activated charcoal (from nut shells)— Barnebey Cheney
Powdered activated charcoal (from coal)—Barnebey Cheney Example IV Two l. of a solution containing 6.4 M.U. of filtered streptomycin broth at pH 7.3 is added to 50 g. of Pittsburgh Cal carbon (available from Pittsburgh Coke and Chemical Company), 12–60 mesh, contained in a one inch tower. The streptomycin solution is run through the tower at 200 ml. per hour. The column is then washed with 100 ml. water. Maltol assay of the eluate shows no streptomycin to be present. A solution of 1.2 g. sodium borohydride in 100 ml. water (pH 10) is run through the column over a half hour periods. The column is then washed with water until free of boron and eluted with 200 ml. of 10% acetone water at pH 1.5. Streptidine assay of the eluate showed 6.3 M.U. of dihydrostreptomycin to be present. Maltol assay for streptomycin was negative.

Example V

One l. of filtered streptomycin broth at pH 7.2 containing 3.2 M.U. of streptomycin and 20 g. of Norit SG2 (a powdered charcoal available from American Norit) are slurried together and 1 g. of solid sodium borohydride added. The pH rises to 10.6. The suspension is stirred for one hour, filtered, and the filter cake washed with 1 l. of water. The dihydrostreptomycin is eluted with 100 ml. of 10% aqueous acetone at pH 1.5. Streptidine assay of the eluate shows 3.18 M.U. of dihydrostreptomycin.

Example VI

Five-hundred ml. of de-ashed Amberlite IRC–50 resin containing approximately 90 M.U. of streptomycin is slurried in 300 ml. of water. To the slurry is added a solution of 30 ml. of an 11.6% solution of sodium borohydride in 100 ml. of water over a 3-hour period. The mixture, pH about 9, is stirred for 4 hours following the borohydride addition then filtered and the resin adsorbate washed with water until the boron salts are reduced to a minimum as indicated by the p-nitrobenzeneazochromatropic acid test (Feigl, Spot Tests, Inorganic Applications, Elsevier Publishing Company, New York, Vol. I, p. 312, 1954).

The resin adsorbate is slurried in 500 ml. of water and the pH adjusted to 1.2 with 20% sulfuric acid. Assay of the eluate showed 79.5 M.U. of dihydrostreptomycin and 4.7 M.U. of streptomycin (streptidine and maltol assays, respectively) to be present. The pH of the eluate was adjusted to 7.5 by means of barium hydroxide to remove excess sulfuric acid.

The streptomycin content of the eluate can be reduced to less than 1% by repetition of this procedure.

Example VII

To a slurry, in 200 ml. of water, of 500 ml. of Amberlite IRC–200 containing approximately 90 M.U. of streptomycin (de-ashed according to known procedures) is added ten 2 ml. portions of an 11.6% solution of sodium borohydride. The additions are spaced 10 minutes apart. After a total of 4 hours reaction time a maltol assay of the resin adsorbate showed 3.5% sterptomycin to be present. A further 2 ml. portion of sodium borohydride solution is added, the mixture stirred for 2 hours then filtered and washed free of boron salts.

The adsorbate is eluted with sulfuric acid (pH 1.0), the eluate (88.6 M.U. dihydrosterptomycin) neutralized with barium hydroxide, then de-ashed by passage over Dowex 50, acid cycle. The effluent (containing 87 M.U. of dihydrostreptomycin) is neutralized by means of barium hydroxide, concentrated and decolorized by charcoal treatment. The dihydrostreptomycin is crystallized from aqueous methanol.

The crystalline material assays 80.5 M.U. of dihydro compound and contains less than 1% streptomycin.

Example VIII

A sulfonic acid ion exchange resin, Dowex 50 (400 ml.), fully loaded with hydroxystreptomycin is washed with water (500 ml.) then slurried in 200 ml. water and subjected to the procedure of Example VI.

The eluate is found to consist of less than 1% hydroxystreptomycin.

Example IX

Repetition of the procedure of Example VI but using the following cation exchange resins, fully loaded with streptomycin, in place of the Amberlite IRC–50 streptomycin adsorbate produces dihydrostreptomycin containing less than 1% streptomycin: Amberlite XE–89, Dowex 50–$X_1$, Dowex 50–$X_2$, Amberlite IR–120, Amberlite XE–176, Duolite C–10 (Chemical Process Co.), Permutit H (Permutit Co.), Chempro C–20 (Chemical Process Co.) and Wofatite C (Veb. Farbenfabriken, Wolfen).

Example X

Repetition of the procedure of Example VI but using potassium borohydride, lithium borohydride, sodium trimethoxy borohydride and lithium trimethoxy borohydride in place of sodium borohydride produces substantially the same results.

What is claimed is:

1. A process for reducing a streptomycin-type compound selected from the group consisting of streptomycin and hydroxystreptomycin which comprises adsorbing said compound on a solid matrix selected from the group consisting of carbon and cation exchange resins to form an adsorbate, treating said adsorbate with at least one equivalent of a reducing agent selected from the group consisting of sodium borohydride, potassium borohydride, lithium borohydride, sodium trimethoxyborohydride, and lithium trimethoxyborohydride in water, at a pH of from about 8 to about 11, to produce the corresponding dihydrostreptomycin-type compound.

2. The process of claim 1 wherein the dihydrostreptomycin-type product is recovered.

3. The process of claim 2 wherein the solid matrix is carbon.

4. The process of claim 2 wherein the solid matrix is a carboxylic cation exchange resin.

5. The process of claim 2 wherein the solid matrix is a sulfonic acid cation exchange resin.

6. A process for reducing streptomycin which comprises adsorbing the streptomycin on a solid matrix selected from the group consisting of carbon and cation exchange resins to form an adsorbate, treating said adsorbate in water, at a pH of from about 8 to about 11, with at least 1 equivalent of sodium borohydride to produce dihydrostreptomycin and isolating said dihydrostreptomycin.

References Cited

UNITED STATES PATENTS

| | | | |
|---|---|---|---|
| 2,528,022 | 10/1950 | Van Dolah et al. | 260—210 |
| 2,528,188 | 10/1950 | Taylor | 260—210 |
| 2,748,108 | 5/1956 | Paul et al. | 260—210 |
| 2,790,792 | 4/1957 | Kaplan | 260—210 |

LEWIS GOTTS, *Primary Examiner.*

JOHNNIE R. BROWN, *Assistant Examiner.*